US010383045B2

(12) United States Patent
Thanayankizil (10) Patent No.: US 10,383,045 B2
(45) Date of Patent: Aug. 13, 2019

(54) WIRELESS SERVICE DISCOVERY

(71) Applicant: GM Global Technology Operations LLC, Detroit, MI (US)

(72) Inventor: Lakshmi V. Thanayankizil, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 15/698,957

(22) Filed: Sep. 8, 2017

(65) Prior Publication Data

US 2019/0082381 A1  Mar. 14, 2019

(51) Int. Cl.

| | |
|---|---|
| *H04W 48/18* | (2009.01) |
| *H04W 4/40* | (2018.01) |
| *H04W 48/16* | (2009.01) |
| *H04L 29/08* | (2006.01) |
| *H04W 4/12* | (2009.01) |
| *H04W 76/10* | (2018.01) |
| *H04W 4/02* | (2018.01) |
| *H04W 48/04* | (2009.01) |
| *H04W 28/02* | (2009.01) |

(Continued)

(52) U.S. Cl.
CPC ............ *H04W 48/18* (2013.01); *H04L 67/12* (2013.01); *H04W 4/02* (2013.01); *H04W 4/12* (2013.01); *H04W 4/40* (2018.02); *H04W 28/0215* (2013.01); *H04W 28/0226* (2013.01); *H04W 48/04* (2013.01); *H04W 48/16* (2013.01); *H04W 52/0209* (2013.01); *H04W 76/10* (2018.02); *H04W 4/80* (2018.02)

(58) Field of Classification Search
CPC ..... H04W 48/04; H04W 48/16; H04W 48/18; H04W 4/02–029; H04W 4/04; H04W 4/046; H04W 4/12; H04W 4/40–48; H04W 4/70; H04W 4/80; H04W 28/0215; H04W 28/0221; H04W 28/0226; H04W 76/10; H04W 52/0209; H04W 52/0225; H04W 52/0251; H04L 67/12
See application file for complete search history.

(56) References Cited

U.S. PATENT DOCUMENTS

2015/0025917 A1\* 1/2015 Stempora ............... G06Q 40/08
705/4
2015/0154870 A1\* 6/2015 Endo ........................ G08G 1/20
701/517

(Continued)

*Primary Examiner* — Joshua Kading
(74) *Attorney, Agent, or Firm* — Reising Ethington P.C.; David Willoughby (57) ABSTRACT

A system and method for carrying out wireless service discovery at a vehicle, the method comprising: determining that a wireless service is desired; determining a vehicle state, wherein the vehicle state is indicative of an operating vehicle state or an environmental vehicle state; selecting a wireless discovery mechanism based on the vehicle state, wherein the selection comprises selecting one of a plurality of different wireless discovery mechanisms, each of which utilizes a different wireless technology using the vehicle electronics; receiving one or more wireless communication messages at the vehicle using the wireless discovery mechanism, wherein the one or more received wireless communication messages include data corresponding to one or more wireless services; and determining availability of the wireless service based on the received communication messages.

20 Claims, 2 Drawing Sheets

(51) Int. Cl.
*H04W 52/02* (2009.01)
*H04W 4/80* (2018.01)

(56) References Cited

U.S. PATENT DOCUMENTS

2015/0163334 A1* 6/2015 Shin .................. H04W 4/16
                                                        455/41.2
2016/0165174 A1* 6/2016 Nishimura ....... H04N 21/41422
                                                        386/248
2018/0338329 A1* 11/2018 Sergakis ............... H04W 76/10

* cited by examiner

WIRELESS SERVICE DISCOVERY

INTRODUCTION

The disclosure relates to wireless service discovery at a vehicle including selecting a wireless discovery mechanism based on a vehicle state.

Many electronic devices now carry out network communications. For example, many vehicles can transmit voice and data communications over both a short-range wireless network, such as Wi-Fi™, and a cellular network, such as GPRS or CDMA. Now, many vehicle components, devices, and modules desire to send to or receive data from a remote server, such as a vehicle backend service facility. Vehicles may additionally include numerous wireless communication protocols and mechanisms, such as Wi-Fi™, Bluetooth™, and Wi-Fi Aware™. Additionally, vehicles may desire to perform certain operations requiring a short-range wireless connection in a variety of circumstances and/or vehicle operating states. In some instances, it may be desirable to use one protocol or mechanism over another depending on a vehicle state.

SUMMARY

According to an embodiment, there is provided a method of carrying out wireless service discovery at a vehicle, the method comprising: receiving a request for wireless service; determining a vehicle state, wherein the vehicle state is indicative of an operating vehicle state or an environmental vehicle state; selecting a wireless discovery mechanism based on the vehicle state, wherein the selection comprises selecting one of a plurality of different wireless discovery mechanisms, each of which utilizes a different wireless technology using the vehicle electronics; receiving one or more wireless communication messages at the vehicle using the wireless discovery mechanism, wherein the one or more received wireless communication messages include data corresponding to one or more wireless services; and determining availability of the wireless service based on the received communication messages.

According to another embodiment, there is provided a method of carrying out wireless service discovery at a vehicle, the method comprising: identifying a wireless service that is to be used by the vehicle, wherein the desired wireless service includes the use of wireless communications to transfer data to and from the vehicle; determining an operating vehicle state, wherein the operating vehicle state includes an ignition state; and selecting a wireless discovery mechanism based on the operating vehicle state, wherein the wireless discovery mechanism includes operation of a short-range wireless communications chipset.

According to yet another embodiment, there is provided a vehicle wireless communications system, comprising: a body control module; a wireless communications device, comprising: a wireless communication chipset; a computer-readable memory; and a processor; wherein the wireless communications device is configured to: receive an indication that a wireless service is to be accessed; receive data from the body control module that is indicative of an operating vehicle state; select a wireless discovery mechanism based on the operating vehicle state, wherein the wireless discovery mechanism includes operation of a short-range wireless communications chipset; and receive wireless messages using the selected wireless discovery mechanism.

BRIEF DESCRIPTION OF THE DRAWINGS

Exemplary embodiments will hereinafter be described in conjunction with the appended drawings, wherein like designations denote like elements, and wherein.

DETAILED DESCRIPTION

The system and methods below enable a vehicle to selectively configure a wireless communications device based on a vehicle state. In one embodiment, the vehicle determines that a wireless service is desired, determines a vehicle state, and, then, based on the vehicle state, the vehicle selects a wireless discovery mechanism. The wireless discovery mechanism can be any short-range wireless communication, as will be discussed more below. The vehicle state may include any operating vehicle state or environmental vehicle state. An operating vehicle state can include a mechanical state, such as an ignition state or gear state (e.g., one of PRDNL), or may include an electronic or power state, such as states based at least in part on battery life, presence of a battery charging connection, established connections with other devices, and states of electronic vehicle components including a wireless communications device and body control module. Additionally, the environmental vehicle state may pertain to information concerning the vehicle's surroundings, such as the vehicle's geolocation or the presence of wireless devices or hotspots.

In one embodiment, the vehicle may desire to check for over-the-air (OTA) updates for certain vehicle components. In one scenario, the vehicle may currently be on (i.e., the ignition is on) and in a drive gear. In this scenario, the vehicle may select to use Bonjour™ for wireless service discovery, such as for determining whether a wireless Internet connection is available. In another scenario, the vehicle may be in a parking gear with the ignition on and, thus, the vehicle may select to use Neighbor Awareness Networking (NAN) or Wi-Fi Aware™ for this service discovery. In yet another scenario, the vehicle may be turned off (i.e., ignition is off) and, thus, a wireless discovery mechanism that uses a relatively low amount of energy may be employed, such as Bluetooth Low Energy™ (BLE).

Figure 1:
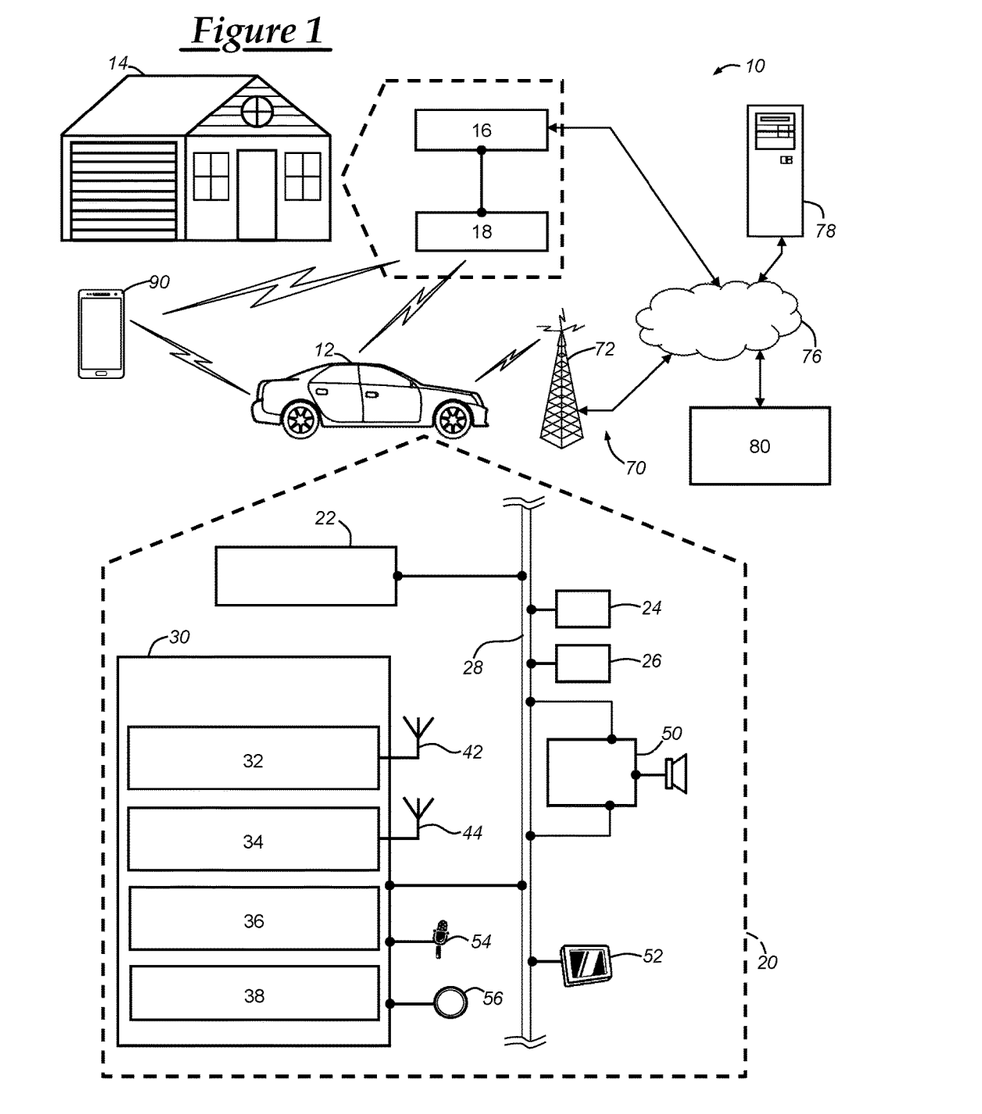
FIG. 1 is a block diagram depicting an embodiment of a communications system that is capable of utilizing the method disclosed herein.

Referring now to FIG. 1, there is shown an operating environment that comprises a communications system 10 and that can be used to implement the method disclosed herein. Communications system 10 generally includes a vehicle 12 with a wireless communications device 30, a residence 14, one or more wireless carrier systems 70, a land communications network 76, a computer 78, and a remote facility 80. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

The location 14 is depicted as a residential home, however, it should be appreciated that location 14 may be any location that includes a wireless access point (WAP) and a network access device, such as a workplace, other user-specific location, a dealer location, an assembly location, or a service location. As used herein, a user-specific location is any location that is specific to a user of the vehicle, such as a home residence or a workplace. Location 14 is shown to include router 16 and non-vehicle wireless access point (WAP) 18. A non-vehicle wireless access point is a wireless access point which is not installed as part of the vehicle electronics 20 or carried by vehicle 12. Router 16 is a network access device and, as shown, may provide network connectivity via land network 76. A network access device is a hardware device that communicates with one or more remote networks using a router and/or a modem. For example, location 14 may include a modem (not shown) that is configured to transfer data between the router and land network 76.

Computers 78 (only one shown) can be some of a number of computers accessible via a private or public network such as the Internet. Each such computer 78 can be used for one or more purposes, such as a web server accessible by the WAP 18. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 is designed to provide the vehicle electronics 20 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Mobile device 90 is a non-vehicle wireless device, meaning that it is a device capable of wireless communications and not a part of vehicle 12 or vehicle electronics 20. For example, the device 90 may be a vehicle operator's or user's cellular telephone or other personal mobile device. The mobile device includes: hardware, software, and/or firmware enabling cellular telecommunications and/or short range wireless communication (SRWC), as well as other wireless device functions and applications. The hardware of mobile device 90 comprises a processor and memory for storing the software, firmware, etc. This memory may include volatile RAM or other temporary powered memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)). This may include an application that can allow a vehicle user to communicate with vehicle 12 and WAP 18. In some embodiments, the application may enable the device 90 to control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 90 to view information pertaining to the vehicle (e.g., the current location of the vehicle, whether the vehicle is locked or unlocked) and/or pertaining to an account associated with the user or vehicle. In addition, the application may also allow the user to connect with the remote facility 80 or call center advisors at any time. Wireless device 90 is shown as a smartphone having cellular telephone capabilities. In other embodiments, device 90 may be a tablet, laptop computer, or any other suitable device.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a body control module (BCM) 22, a GPS module 24, other vehicle system modules (VSMs) 26, a wireless communications device 30, vehicle user interfacing components/systems 50-56, and numerous other components and devices. Some or all of the different vehicle electronics may be connected for communication with each other via one or more communication busses, such as bus 28. Communications bus 28 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as BCM 22, GPS module 24, wireless communications device 30, and audio system 50, as will be described in detail below. The vehicle 12 can also include other VSMs 26 in the form of electronic hardware components that are located throughout the vehicle and typically receive input from one or more sensors and use the sensed input to perform diagnostic, monitoring, control, reporting and/or other functions. Such received input can be used to determine a vehicle state. Each of the VSMs 26 is preferably connected by communications bus 28 to the other VSMs, as well as to the wireless communications device 30, and can be programmed to run vehicle system and subsystem diagnostic tests. As examples, one VSM 26 can be an engine control module (ECM) that controls various aspects of engine operation such as fuel ignition and ignition timing and another VSM 26 can be a powertrain control module that regulates operation of one or more components of the vehicle powertrain. One or more VSMs 26 may periodically or occasionally have their software or firmware updated and, in some embodiments, such vehicle updates may be OTA updates that are received from a remote facility 80 via land network 76, router 16, WAP 18, and wireless communications device 30, as will be discussed more below. As is appreciated by those skilled in the art, the above-mentioned VSMs are only examples of some of the modules that may be used in vehicle 12, as numerous others are also possible.

Body control module (BCM) 22 is shown in the exemplary embodiment of FIG. 1 as being electrically coupled to communication bus 28. In some embodiments, the BCM 22 may be integrated with or part of a center stack module (CSM). Or, the BCM and CSM may be separate devices that are connected to one another via bus 28. BCM 22 may communicate with wireless communications device 30 and/or one or more vehicle system modules, such as GPS 24, audio system 50, or other VSMs 26. BCM may include a processor and memory such that the BCM may direct one or more vehicle operations including, for example, controlling central locking, air conditioning, and power mirrors. BCM 22 may receive data from wireless communications device 30 and, subsequently, send the data to one or more vehicle modules. For example, as will be explained more below, the wireless communications device 30 may receive over-the-air (OTA) updates for one or more vehicle modules. Then, upon receiving such updates, the device 30 may notify and/or send the updates to the BCM 22. BCM 22 may install the updates on the appropriate modules and/or send the updates to the appropriate modules.

Additionally, BCM 22 may provide information corresponding to the vehicle state or of certain vehicle components or systems. For example, the BCM may provide the wireless communications device 30 with information indicating whether the vehicle's ignition is turned on, the gear the vehicle is presently in (i.e. gear state), and/or other information regarding the vehicle. Further, the wireless communications device 30 may provide the BCM 22 with information. For example, BCM 22 may receive a notification or indication from wireless communications device 30 that a certain wireless service is available (e.g., a wireless network connection is available) and/or that a wireless network connection has been established with a hotspot or wireless access point, such as WAP 18.

Wireless communications device 30 is capable of communicating data via short range wireless communications (SRWC). As shown in the exemplary embodiment of FIG. 1, wireless communications device 30 includes a wireless access points 32 and 34, a processor 36, memory 38, and antennas 42 and 44. In many embodiments, the wireless communications device 30 may be specifically configured to carry out the method disclosed herein. In one embodiment, wireless communications device 30 may be a standalone module or, in other embodiments, device 30 may be incorporated or included as a part of one or more other vehicle system modules, such as a body control module, an infotainment module, a telematics module, a head unit, CSM, and/or a gateway module. In some embodiments, the device 30 can be implemented as an OEM-installed (embedded) or aftermarket device that is installed in the vehicle.

Wireless communications device 30 can be configured to communicate wirelessly using one or more wireless discovery mechanisms. As used herein, a wireless discovery mechanism is specific software protocol and/or set of hardware component(s) that can be used to transmit and receive wireless communications. A wireless discovery mechanism may include short range wireless communications (SRWC) such as any of the IEEE 802.11 protocols, WiMAX™, Wi-Fi™, Wi-Fi Aware™, Neighbor Awareness Networking (NAN), ZigBee™, Wi-Fi direct™, Bluetooth™, Bluetooth Low Energy™ (BLE), Bonjour™, or near field communication (NFC). The wireless access points 32,34 may be configured to operate according to one or more wireless discovery mechanisms. Further, each access point 32,34 may include a wireless chipset that enables one or more wireless discovery mechanisms.

For example, access point 32 may include a Bluetooth™ chipset and access point 34 may include a Wi-Fi™ chipset. In such an example, access point 32 may enable Bluetooth™ or BLE wireless communications and access point 34 may enable Wi-Fi™ and Wi-Fi Aware™ communications. Thus, the two access points in this example enable four separate wireless discovery mechanisms. Additionally, in some embodiments, the wireless communications device may contain a cellular chipset thereby allowing the device to communicate via one or more cellular protocols. Moreover, the vehicle may include numerous wireless communications devices and, in some embodiments, each of the wireless communications devices may include different wireless chipsets.

In addition to acting as a wireless access point for devices to connect to (e.g., a server mode), wireless communications device 30 may carry out wireless communications with another wireless access point, such as a non-vehicle wireless access point (WAP) 18 at location 14. In such an arrangement, WAP 18 may be connected to a router 16 and provide device 30 a connection to the Internet or other remote network. Device 30 may be set to a station or client mode and, thus, may then carry out wireless communications with WAP 18. As used herein, a client or a station mode is an operating mode of a wireless communications device that enables the device to act as a station or client device thereby allowing the device to scan for and connect to host devices (e.g., wireless access points). More particularly, in the client mode, the client device permits another device (a server device) to control communication protocols, etc. The WAP 18, acting as a server device, may be set to a wireless access point mode and provide a hotspot for device 30 to connect to when operating in a station mode. A hotspot is an area where a wireless data connection may be established between a wireless device operating in a station or client mode and the device hosting the hotspot via a wireless access point. It should be appreciated that the protocol used in providing a hotspot is not limited to Wi-Fi™ and that any SRWC, such as those listed above, may be used.

The wireless communication device 30 may operate in both a station or client mode and a wireless access point mode at the same time through, for example, use of a dual band antenna. Alternatively or additionally, the wireless communications device 30 may switch between a wireless access point mode and a station mode thereby enabling both modes of operation at the same time. This would enable wireless communications device 30 to communicate concurrently with a first wireless device (e.g., a mobile device or VSM) operating in the wireless access point mode and to communicate with WAP 18 operating in the station mode. This may enable the vehicle to throttle wireless communications between devices at or near the vehicle (e.g., VSMs 26) and remote servers or computers (e.g., remote facility 80, computers 78) through device 30.

The wireless communications device 30 may be used by the vehicle to determine whether certain wireless services are available. Additionally, wireless communications device 30 may be used to offer services to one or more wireless devices, such as mobile device 90, which will be discussed more below. As used herein, a wireless service is a service that is offered by one or more wireless devices (the "servicing device") and/or used by one or more wireless devices where the service is performed at least in part through wireless communications. Such services may be, for example, a printing service or an Internet connection service. In one embodiment, the WAP 18 may be the servicing device and, in other embodiments, mobile device 90 may be the servicing device and may offer a variety of different services. Additionally, in some embodiments, both mobile device 90, wireless communications device 30, and WAP 18 may operate with one another to provide services among one another. In yet another embodiment, a wireless device connected to WAP 18, such as mobile device 90, may be the servicing device and WAP 18 may be an intermediary device that operates to broadcast certain services offered by the servicing device. There may be any number of intermediary devices and/or servicing devices in any given system 10.

The vehicle may select a wireless discovery mechanism based on a vehicle state, such as an operating vehicle state or an environmental state. After selecting the wireless discovery mechanism, the vehicle may then listen for wireless messages using the selected wireless discovery mechanism. In one embodiment, the vehicle listens for and receives beacon messages via its WAPs 32,34 from a servicing device, such as WAP 18. The vehicle may then evaluate the received messages to determine whether a desired wireless service, such as an Internet connection, is available. If so, the vehicle can generate and send a reply message to the servicing device. The reply message may include vehicle information, such as a media access control (MAC) address of the wireless communications device 30 or a vehicle identification number (VIN). The servicing device and the vehicle can then carry out subsequent correspondence to establish a secure connection. For example, a four-way handshake pursuant to Wi-Fi Protected Access II (WPA2) may be carried out between the wireless communication device 30 and a WAP 18.

In some embodiments, the type of wireless connection that is to be established can be based on the type of service that is being utilized. For example, a printing service may require the communication of low amounts of messages and, thus, BLE may be sufficient. In another example, a large vehicle OTA update may be downloaded from a remote server, such as computer 78 or a server at remote facility 80, and, thus, a Wi-Fi™ connection may be more desirable. Additionally or alternatively, the type of wireless connection can be based on the vehicle state.

Also, wireless communications device 30 may be in communication with one or more remote networks via packet-switched data communication. This packet-switched data communication may be carried out through use of an non-vehicle wireless access point that is connected to a land network via a router or modem, such as WAP 18 and router 16 described above. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may, via a cellular chipset, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. In one embodiment, device 30 includes an application that enables the method described below in FIG. 2. Memory 38 may include RAM, other temporary powered memory, any non-transitory computer-readable medium (e.g., EEPROM), or any other electronic computer medium that stores some or all of the software needed to carry out the various external device functions discussed herein.

Global position system (GPS) module 24 receives radio signals from a constellation of GPS satellites (not shown). From these signals, the module 24 can determine vehicle position which may enable the vehicle to determine whether it is at a known location, such as home or workplace 14. Moreover, GPS module 24 can provide this location data to wireless communications device 30, which can then use this data to identify known locations, such as a vehicle operator's home or workplace. Additionally, GPS module 24 may be used to provide navigation and other position-related services to the vehicle operator. Navigation information can be presented on the display 52 (or other display within the vehicle) or can be presented verbally such as is done when supplying turn-by-turn navigation. The navigation services can be provided using a dedicated in-vehicle navigation module (which can be part of GPS module 24), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management. Also, new or updated map data can be downloaded to the GPS module 24 from the remote facility 80 via a vehicle telematics unit.

Vehicle electronics 20 also includes a number of vehicle user interfaces that provide vehicle occupants with a means of providing and/or receiving information, including audio system 50, visual display 52, microphone 54, and pushbutton(s) 56. As used herein, the term "vehicle user interface" broadly includes any suitable form of electronic device, including both hardware and software components, which is located on the vehicle and enables a vehicle user to communicate with or through a component of the vehicle. Audio system 50 provides audio output to a vehicle occupant and can be a dedicated, stand-alone system or part of the primary vehicle audio system. According to the particular embodiment shown here, audio system 50 is operatively coupled to both vehicle bus 28 and an entertainment bus (not shown) and can provide AM, FM and satellite radio, CD, DVD and other multimedia functionality. This functionality can be provided in conjunction with or independent of the infotainment module described above. Visual display or touch screen 52 is preferably a graphics display, such as a touch screen on the instrument panel or a heads-up display reflected off of the windshield, and can be used to provide a multitude of input and output functions. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. The pushbutton(s) 56 allow manual user input into the communication device 30 to provide other data, response, or control input. Various other vehicle user interfaces can also be utilized, as the interfaces of FIG. 1 are only an example of one particular implementation.

Figure 2:
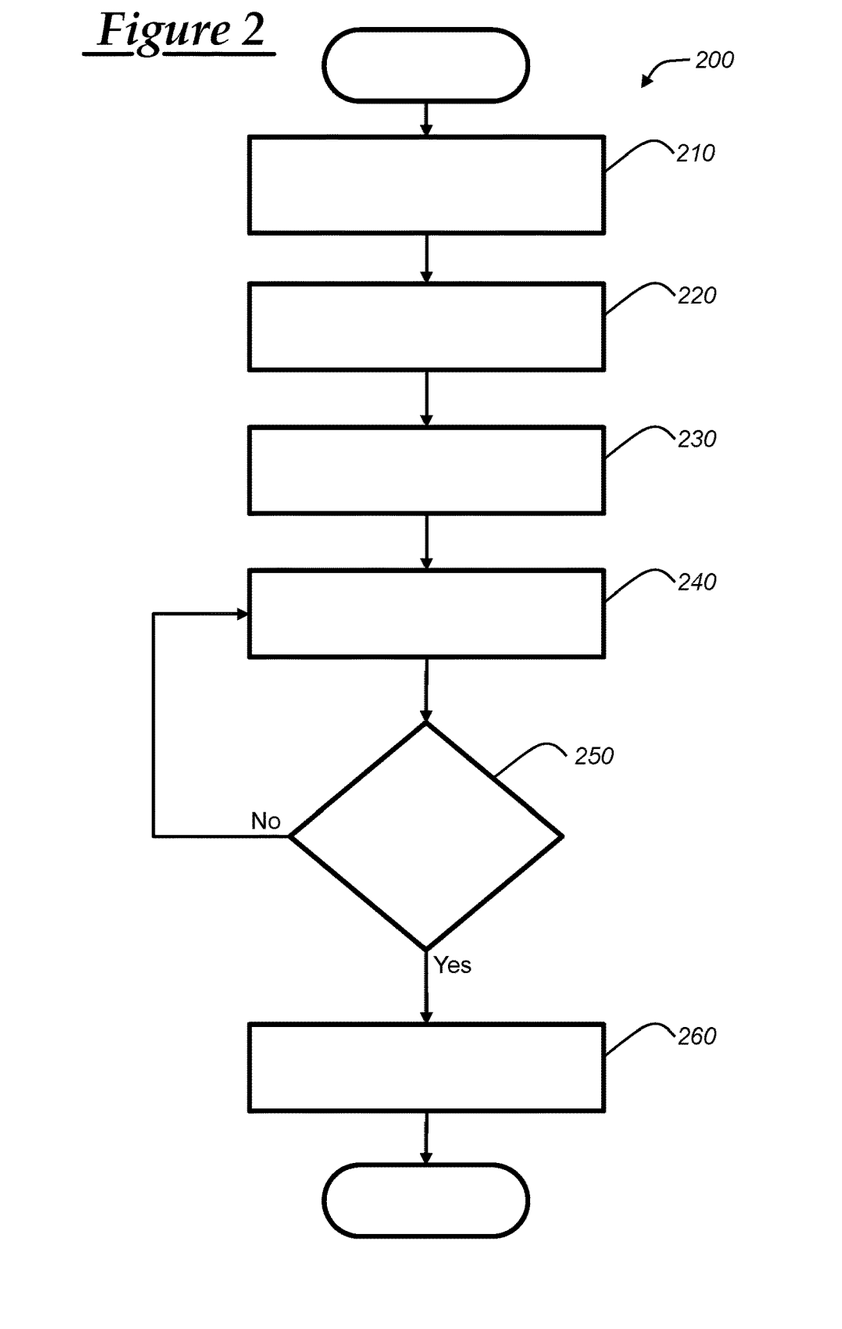
FIG. 2 is a flowchart illustrating a method of carrying out wireless service discovery at a vehicle.

With reference to FIG. 2, there is shown an embodiment of a method 200 of carrying out wireless service discovery at a vehicle. In one embodiment, the method may be carried out by vehicle electronics 20. The method begins with step 210, which includes receiving a request for wireless service. This request need not be explicit, but may be an attempt by a vehicle system module to access remote services. As discussed above, a wireless service may be an Internet connection or may be a data connection to a certain computer 78 or remote facility 80. In one scenario, the vehicle may desire to check for over-the-air (OTA) updates for one or more vehicle system modules, which may require a connection to a remote network via land network 76. The OTA updates may comprise software or firmware that is to be installed on one or more vehicle system modules. For example, the OTA update may be a firmware update for a VSM 26. The method 200 continues to step 220.

In step 220, a vehicle state is determined, wherein the vehicle state is indicative of an operating vehicle state or an environmental vehicle state. As discussed above, the vehicle state may pertain to mechanical and/or electronic conditions, properties, or attributes of the vehicle (the "operational state") or environmental conditions, properties, or attributes of the vehicle (the "environmental state"). For example, the operational state may be based on whether the vehicle's ignition is "on" (the "ignition state"), a gear that the vehicle is presently in (the "gear state"), a battery level of the vehicle (the "battery charge state"), and/or whether the vehicle is currently charging or connected to a battery charger (the "charging connection state"). The environmental state can be based on the geolocation of the vehicle and/or the presence of non-vehicle wireless devices.

The vehicle state may be determined based on information received from a plurality of vehicle system modules, including the BCM 22 and other VSMs 26. In one embodiment, the ignition state, battery charge state, gear state, and charging connection state, may be determined by BCM 22. Additionally, the geolocation of the vehicle may be determined by GPS module 24 and the presence of non-vehicle wireless devices may be determined by the wireless communications device 30. The vehicle state or certain sub-states (e.g., the ignition state) may be saved in memory 38 of wireless communications device 30 and/or memory of another vehicle module. The method continues to step 230.

In step 230, a wireless discovery mechanism is selected based on the vehicle state. The selection may comprise selecting one of a plurality of different wireless discovery mechanisms, each of which utilizes a different wireless technology using the vehicle electronics. It may be desirable to select a certain wireless discovery mechanism based on the vehicle state since certain wireless discovery mechanisms may use different amounts of resources and have different capabilities. For example, typical Wi-Fi™ protocols, such as IEEE 802.11b/g/n, may be desirable when the vehicle has plenty of battery life, has its ignition on, or is currently being charged. However, if the vehicle's battery life is low, its ignition is off, and the battery is not currently being charged, then a wireless discovery mechanism that uses less power may be desired, such as Bluetooth Low Energy™ (BLE).

Other factors besides power consumption may be considered in the wireless discovery mechanism selection as well. Additionally, depending on the vehicle state, the vehicle may disregard certain vehicle characteristics and/or give different weights to certain vehicle characteristics when selecting a wireless discovery mechanism. For example, the vehicle may detect that the vehicle is located at a geographic location where a known wireless access point (or wireless service) has previously been detected. Thus, since the probability of discovering the WAP or wireless service may be increased due to this realization and the amount of time it may take to establish a connection may be reduced, the vehicle may select a wireless discovery mechanism regardless of the amount of power such discovery mechanism may use. Additionally, the wireless discovery mechanism may be selected based on the wireless service that is desired (see step 210). Here, the vehicle may desire an Internet connection and also may realize that it is at a home location that has a WAP 18. Therefore, even though the vehicle may be in an ignition "off" state, the vehicle may nevertheless select Wi-Fi™ as the wireless discovery mechanism. There are plenty of other considerations that may be used in selecting a wireless discovery mechanism, as these specific examples are merely exemplary. In other embodiments, multiple wireless discovery mechanisms may be selected. The method then continues to step 240.

In step 240, the vehicle receives one or more wireless communication messages at the vehicle using the wireless discovery mechanism, wherein the one or more received wireless communication messages include data corresponding to one or more wireless services. The vehicle may receive one or more messages via antennas 42,44. The messages may be stored in memory 38 and processed by processor 36. Processor 36 may parse the message and extract certain information, such as information corresponding to one or more wireless services. This information may be evaluated in conjunction with other information at the vehicle to determine if the wireless service that is desired (see step 210) is available. In one embodiment, the WAP 18 may include services that are being offered by one or more other wireless devices that are also connected to WAP 18. In step 250, if it is determined that the desired wireless service is available, then the method continues to step 260; otherwise, the method continues to step 240, wherein other wireless messages may be listened for.

In step 260, a wireless connection is established between the wireless communications device and a servicing device. In one embodiment, the connection is established directly with the servicing device. In other embodiments, the connection is established with the servicing device via one or more intermediary devices, such as WAP 18. The wireless connection may be established through use of the same wireless technology as that which was used in the selected wireless discovery mechanism (see step 230). In other embodiments, the vehicle may determine an appropriate wireless technology to use for the wireless connection, which may be different than the technology used in the selected wireless discovery mechanism. For example, the vehicle may select to use BLE as the wireless discovery mechanism when the vehicle is off and in a low power mode. However, the vehicle may desire to download an OTA update, which can require large amounts of data transfer. Thus, after discovery of an Internet connection using BLE, it may be more resourceful and/or desirable under the circumstances to use Wi-Fi™ to download the OTA update. After a connection is established, the method 200 ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. Put differently, the phrase "A, B, and/or C" includes: "A"; "B"; "C"; "A and B"; "A and C"; "B and C"; and "A, B, and C."

What claimed is:

1. A method of carrying out wireless service discovery at a vehicle, the method comprising:
   receiving a request for a wireless service;
   determining a vehicle state, wherein the vehicle state is indicative of an operating vehicle state or an environmental vehicle state;
   selecting a wireless discovery mechanism based on the vehicle state, wherein the selection comprises selecting one of a plurality of different wireless discovery mechanisms, each of which utilizes a different wireless technology using the vehicle electronics;
   receiving one or more wireless communication messages at the vehicle using the wireless discovery mechanism, wherein the one or more wireless communication messages include data corresponding to the wireless service or one or more other wireless services; and
   determining availability of the wireless service based on the one or more wireless communication messages.

2. The method of claim 1, wherein the wireless service is an Internet connection.

3. The method of claim 1, wherein the vehicle state is indicative of an operating vehicle state.

4. The method of claim 3, wherein the operating vehicle state includes a battery charge state, an ignition state, or a gear state.

5. The method of claim 1, wherein the wireless discovery mechanism includes use of a short-range wireless communications chipset.

6. The method of claim 1, wherein the wireless discovery mechanism includes use of one of the following protocols: Wi-Fi™, Wi-Fi Aware™, Bluetooth™, or Bluetooth Low Energy™.

7. The method of claim 1, further comprising the step of when it is determined that the wireless service is available, then establishing a wireless connection, and when it is determined that the wireless service is not available, then continuing to receive, at the vehicle, one or more additional wireless communication messages in addition to the one or more wireless communication messages.

8. The method of claim 7, further comprising the step of selecting a wireless technology based on the wireless service, and wherein the wireless connection is established using the selected wireless technology.

9. The method of claim 8, wherein the selected wireless discovery mechanism uses a different wireless technology than the selected wireless technology.

10. The method of claim 8, wherein the selected wireless technology is selected based on a vehicle state.

11. A method of carrying out wireless service discovery at a vehicle, the method comprising:
identifying a wireless service that is to be used by the vehicle, wherein the wireless service includes the use of wireless communications to transfer data to and from the vehicle;
determining an operating vehicle state, wherein the operating vehicle state includes an ignition state; and
selecting a wireless discovery mechanism based on the operating vehicle state, wherein the wireless discovery mechanism includes operation of a short-range wireless communications chipset.

12. The method of claim 11, wherein the operating vehicle state is indicative of a present location of the vehicle.

13. The method of claim 11, wherein the wireless service is a wireless service that is to be used by an application that is installed on vehicle electronics included in the vehicle, and wherein the application transfers and receives data via a wireless communications device that is included as part of the vehicle electronics and that includes the short-range wireless communications chipset.

14. The method of claim 11, further comprising the steps of:
receiving one or more messages using the selected wireless discovery mechanism;
determining whether at least one of the one or more messages indicate an availability of the wireless service;
determining a wireless device that sent at least one of the one or more messages; and
if at least one of the one or more messages indicate the wireless service is available, then establishing a connection to the wireless device.

15. The method of claim 14, further comprising the step of notifying an application that is seeking to use the wireless service of the availability of the wireless service based on an evaluation of at least one of the one or more messages.

16. The method of claim 11, further comprising the step of receiving a wireless signal indicative of a location of the vehicle.

17. The method of claim 16, wherein the wireless signal indicates a type of location that the vehicle is presently located at.

18. The method of claim 17, wherein the type of location includes one or more of the following: a vehicle service location, a vehicle assembly location, a user-specific location, or a vehicle dealer location.

19. The method of claim 17, wherein the vehicle state is based at least in part on the location or type of location of the vehicle.

20. A vehicle wireless communications system, comprising:
a body control module;
a wireless communications device, comprising:
a wireless communication chipset;
a computer-readable memory; and
a processor;
wherein the wireless communications device is configured to:
receive an indication that a wireless service is to be accessed;
receive data from the body control module that is indicative of an operating vehicle state;
select a wireless discovery mechanism based on the operating vehicle state, wherein the wireless discovery mechanism includes operation of a short-range wireless communications chipset; and
receive one or more wireless messages using the selected wireless discovery mechanism.

* * * * *